Feb. 23, 1932.  V. P. OSBORNE  1,846,434
WINDSHIELD
Filed Jan. 14, 1931  2 Sheets-Sheet 1

Inventor
V. P. Osborne
By Clarence A. O'Brien
Attorney

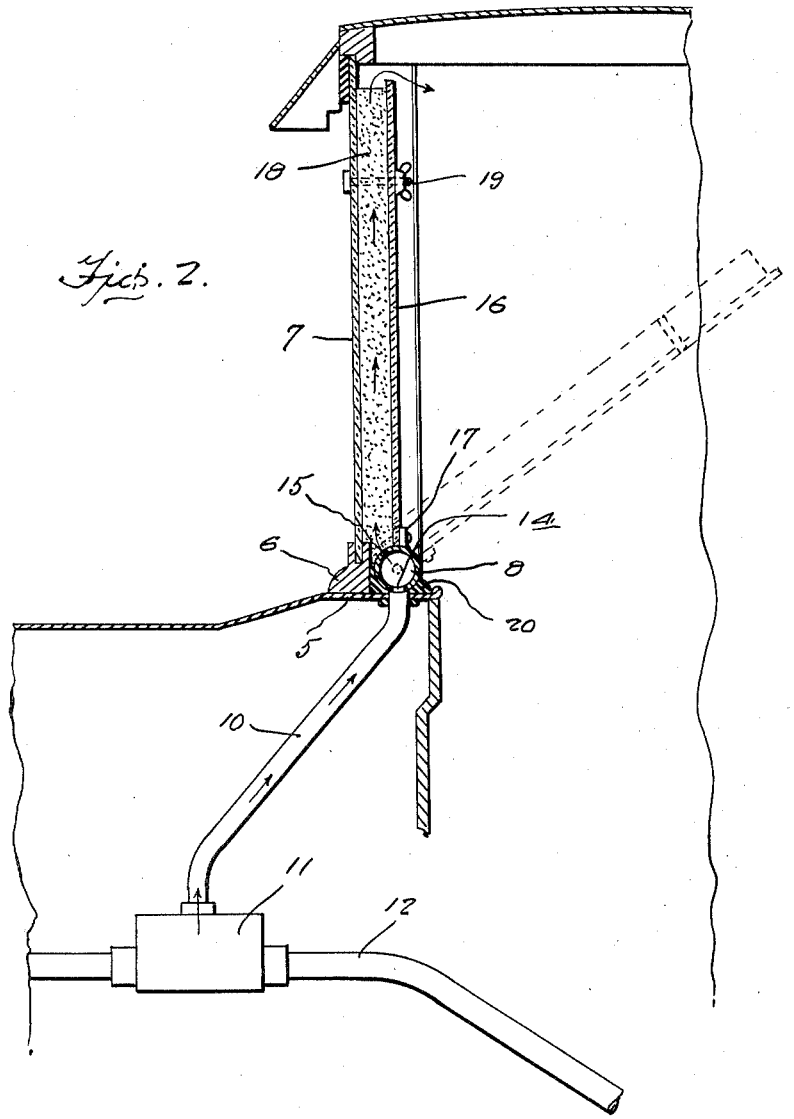

Patented Feb. 23, 1932

1,846,434

UNITED STATES PATENT OFFICE

VIRGIL P. OSBORNE, OF FORT WORTH, TEXAS

WINDSHIELD

Application filed January 14, 1931. Serial No. 508,754.

The present invention relates to a windshield for use in automobiles, trucks, busses, aeroplanes and other vehicles and the prime object of the invention resides in the provision of a windshield whereby the heat from the engine may be utilized in preventing the collection of snow, sleet and ice on the windshield.

Another very important object of the invention resides in the provision of a windshield of this nature which is exceedingly simple in its construction, inexpensive to manufacture and install, thoroughly efficient and reliable in use, and otherwise well adapted to the purpose for which it is designed.

With the above and numerous other objects in view as will appear as the description proceeds the invention resides in certain novel features of construction, and in the combination and arrangement of parts as will be hereinafter more fully described and claimed.

In the drawings:

Figure 2 is a vertical section therethrough taken longitudinally of the vehicle.

Figure 1:
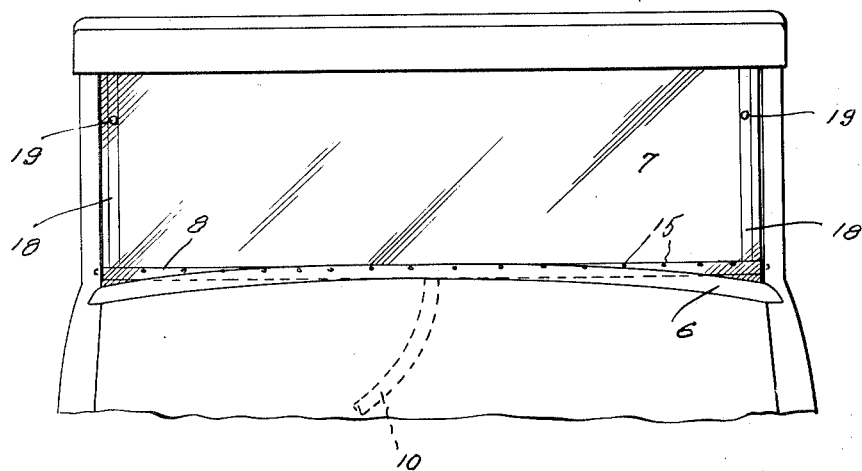
Figure 1 is a front elevation of a windshield embodying the features of my invention.
Figure 3:
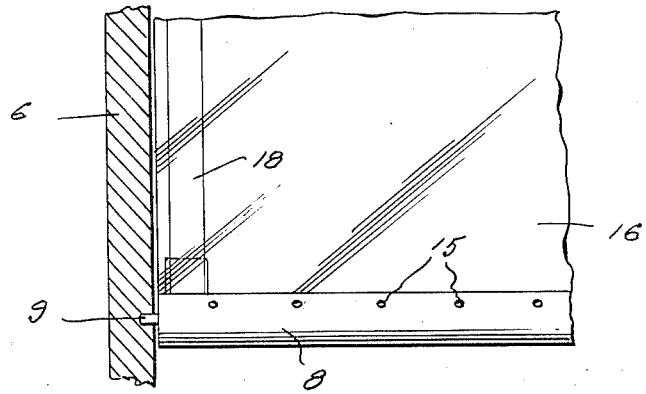
Figure 3 is a fragmentary rear elevation of the windshield.
Figure 4:
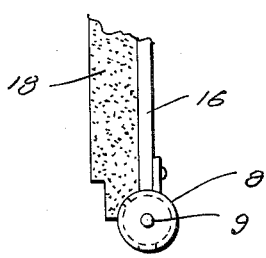
Figure 4 is a detail end elevation of the hot air pipe hinge.

Referring to the drawings, in detail it will be seen that numeral 5 denotes the cowl of a vehicle from which rises the usual windshield frame 6 with the windshield or front glass or panel 7 mounted therein. Numeral 8 denotes a hollow cylinder with closed ends having trunnions projecting outwardly therefrom and journalled in the sides of the frame 6 adjacent the bottom of said frame structure. Numeral 10 denotes a pipe leading upwardly from a stove casing 11 about exhaust pipe 12 and extends through an opening in the cowl 5 to exhaust its hot air into an opening 14 in the central portion of the cylinder 8. This cylinder 8 is provided with a series of apertures 15 leading into the space between the panel 7 and a rear panel 16 fixed to the cylinder 8 as at 17. Side wall gaskets of rubber or like material 18 are disposed between the side portions of the panels 7 and 16 by bolts 19. A felt runner 20 is disposed under the cylinder 8 on top of the cowl 5. When it is desired to clean the panels 7 and 16 the bolts 19 are removed and the panel 16 swung to the dotted line position shown in Figure 2.

It will be noted that the panel 16 terminates a distance below the roof of the vehicle so that the hot air passes out over this panel 16 into the interior of the vehicle. The hot air between the two panels prevents the formation of sleet, snow and the like on the panels and thereby affords good clear vision in cold weather.

It is thought that the construction, utility and advantages of this invention will now be clearly understood by those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, a frame, a transparent panel fixed in the frame, a hollow cylinder with closed ends having outwardly directed trunnions journalled in the frame, a panel fixed to the cylinder and radiating outwardly therefrom, means for delivering hot air into the cylinder, said cylinder having a plurality of openings leading into the space between the panels.

2. In combination, a frame, a transparent panel fixed in the frame, a hollow cylinder with closed ends having outwardly directed trunnions journalled in the frame, a panel fixed to the cylinder and radiating outwardly therefrom, means for delivering hot air into the cylinder, said cylinder having a plurality of openings leading into the space between the panels, side wall gaskets fixed between the panels.

3. In combination, a frame, a transparent panel fixed in the frame, a hollow cylinder with closed ends having outwardly directed trunnions journalled in the frame, a panel fixed to the cylinder and radiating outwardly therefrom, means for delivering hot air into the cylinder, said cylinder having a plurality of openings leading into the space between the panels, side wall gaskets fixed between the panels, detachable means for holding the panels in spaced parallelism.

In testimony whereof I affix my signature.

VIRGIL P. OSBORNE.